March 17, 1931.  J. L. TORGERSON  1,797,108
SAW BLADE ATTACHMENT
Filed May 19, 1930
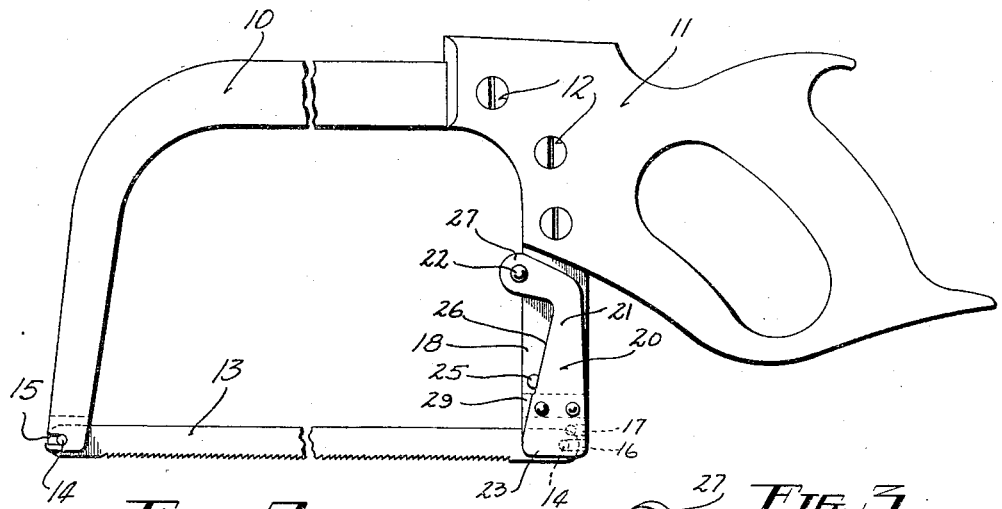
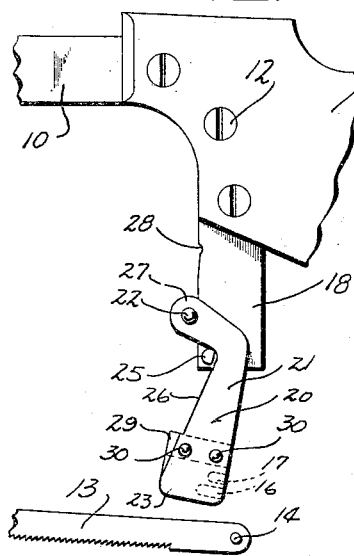
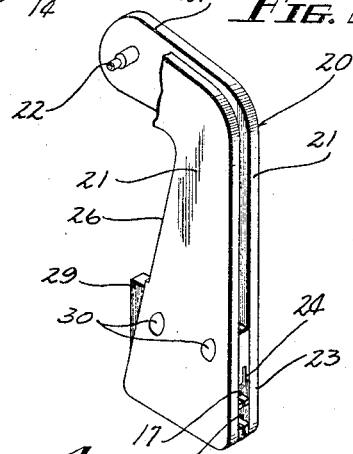
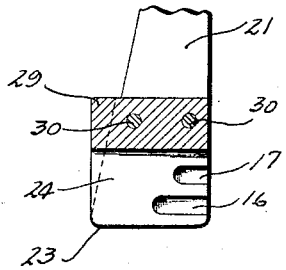
Inventor
Joseph L. Torgerson
By Wheeler, Wheeler & Wheeler
Attorneys Patented Mar. 17, 1931

1,797,108

UNITED STATES PATENT OFFICE

JOSEPH L. TORGERSON, OF MILWAUKEE, WISCONSIN

SAW-BLADE ATTACHMENT

Application filed May 19, 1930. Serial No. 453,429.

My invention relates to an improvement in saw blade attachments.

The object of my invention is to provide an attachment for a saw frame, whereby to provide for the installation of saw blades in the frame without the use of thumb screws, bolts, or other parts which may become disassembled and separated from the main saw frame.

More specifically stated, it is the object of my invention to provide in conjunction with the usual U frame for a meat saw or hack saw, a device which is so associated with the frame as to provide an instantaneously operative attaching means for a saw blade and to incorporate in the attaching means a provision for wedge tensioning of the saw blade.

In the drawings:

Figures 1 is a side elevation of a meat saw provided with my improved blade attaching means.

Figure 2 is a detail of a portion of the meat saw shown in Figure 1 with my improved attachment in released position.

Figure 3 is a perspective of my blade attaching means disassociated from a saw frame.

Figure 4 is a vertical median section through the lower portion of my blade attaching means.

Like parts are identified by the same reference characters throughout the several views.

As shown in the drawings, my new blade attaching device is incorporated in a meat saw comprising a U frame 10 provided with a handle 11, secured thereto by screws 12. Across the extended ends of the U frame provision is made for the tensioning of a saw blade 13 which is provided at either end with a mounting pin 14 which, at the forward end of the saw, is received in a slot 15 and at the rear is received in my improved attachment in one or the other of two slots 16 and 17, respectively, as shown most clearly in Figure 4, and, as will be hereinafter described, the selection of slot 17 as distinguished from slot 16 as a receptacle for the pin 14 at the rear end of the saw determines the tension to be given the saw blade 13 between the projected ends of the U frame 10.

For the purpose of this description, I designate the rearward leg 18 of the U frame 10 as a shank upon which my saw blade attachment 20 is mounted. Structurally this attachment is composed of a bifurcated, L shaped shank embracing portion 21 which terminates upwardly and forwardly in an extension to hold a brace pin 22. The lower portion 23 of my attachment comprises a receptacle for the saw blade and this portion is likewise bifurcated to provide a slot 24 as a receiver for the blade itself. As heretofore explained, the slots 16 and 17 for the reception of the pin 14, are disposed on either side of the slot 24.

Extending through the shank 18, I provide a wedge pin 25 which normally bears against a face 26 of the L shaped upper portion of my attachment, and it will be noted that I have formed my wedge pin with a flat face to bear against the face 26 of the attachment 20, although, as will be hereinafter described, a roller might serve the purpose if properly disposed about the wedge pin 25.

As indicated in Figure 2, my attachment is so constructed as to embrace the shank 18 upon which the attachment may slide to a position where the wedge pin 25 is used as a stop against the L shaped leg 27 of the attachment. In that position, the brace pin bears against the front surface of the shank 18 but the face 26 of the attachment is cut back sufficiently so that the saw receiving portion of the attachment may swing forwardly and release the pin 14 from either of the slots 16 or 17.

When the attachment is in a position of complete embrace of the shank 18, the brace pin 22 may snap into a notch 28 thus definitely positioning the attachment for use when the saw blade is in operative position, and an abutting block 29 is brought in abutting relation to the end of the shank 18.

In operation, my saw blade attaching means is used as follows: With the attachment in the position indicated in Figure 2, the saw blade is secured at the forward end of the frame 10 by inserting one of the pins 14 in slot 15, whereupon the blade may be swung to a position of insertion into the slot 24, and the other pin 14 may be inserted in slot 16 or 17 in the attachment. The attachment may then be forced upwardly, ordinarily by placing the lower portion thereof upon a chopping block or other solid support and pressing downwardly upon the handle so that the wedge pin, acting as a cam upon the face 26 of the attachment, will force the attachment backwardly as the brace pin nears the notch 28 and, as the wedge pin snaps into the notch 28, the abutting block 29 will impinge upon the lower end of the shank 18 and complete the setting operation. Choice of slots 16 or 17 as a receptacle for pin 14 on the saw blade will determine the amount of tension that will have been placed upon the saw blade as the attachment is forced backwardly by the wedge pin 25.

In illustrating my attachment in the drawings I have indicated that use has been made of separate pieces riveted together by means of rivets 30 and 22, but if it is preferred that lighter materials should be used, then stampings riveted or welded together to provide the various parts may be substituted. In Figure 3 I have cut away a portion of the L shaped portion 27 to disclose a collar around pin 22 to maintain the ends of the bifurcated attachment in spaced relation.

I claim:

1. The combination with a saw frame of a saw blade removably attached to one portion of the frame, and an attachment mounted for vertical reciprocation on a depending portion of the frame for adjustment to and from a saw blade receiving position and a saw blade tensioning position.

2. The combination with a saw blade and a notched shank, of a saw frame provided with a pin therethrough, of a bifurcated attachment embracing the shank and prevented by the pin from sliding therefrom, said attachment having a saw receiving portion provided with slots of differing depths to receive portions of the saw blade, and a brace pin between the bifurcated portions of the attachment to be received in the notch of the shank.

3. The combination with a saw frame provided with a shank for attachment to a saw blade, of an attachment for interconnecting the saw blade with the shank, said attachment comprising a bifurcated portion embracing the shank, a pin through the shank to bear against the inner margins of the bifurcated member, and a pin extending between the extremities of the bifurcated portion of the attachment to bear against the inner face of the shank.

4. The combination with a saw frame provided with a projecting frame portion comprising a shank having inner and outer margins, of a projecting pin near the extremity of the shank and near the inner margin thereof, an L shaped bifurcated member embracing and reciprocable upon the shank with a wedge tapered inner margin against the projecting pin, and a pin carried by the bifurcated member and bearing against the inner margin of the shank.

5. The combination with a saw frame provided with a projecting frame portion comprising a shank having inner and outer margins, said inner margin being notched, of a projecting pin near the extremity of the shank and near the inner margin thereof, an L shaped bifurcated member embracing and reciprocable upon the shank with a wedge tapered inner margin against the projecting pin, and a pin carried by the bifurcated member and bearing against the inner margin of the shank, said pin carried by the bifurcated member being so positioned that upon reciprocation of the L shaped member to extreme wedge position the said pin will be received into the notch in the shank.

6. The combination with a saw frame provided with a shank having inner and outer margins and a pin near its front margin, of an L shaped attachment for the shank disposed against a face of the shank with the short leg of the L substantially transverse to the width of the shank and provided with a pin bearing against the inner margin thereof, the long leg of the L shaped attachment being tapered to bear against the pin through the shank, saw blade attaching means at the free end of the long leg of the L whereby in the reciprocation of the attachment upon the shank the pin through the shank will be disposed in the inner angle of the L and so disposed with reference to the pin through the short leg of the L as to permit the long leg of the L to be inclined inwardly of the saw frame.

JOSEPH L. TORGERSON.